United States Patent Office

3,097,190
Patented July 9, 1963

3,097,190
N,N,N',N'-TETRAALKYL ALKYLENE DIAMINE INITIATORS FOR THE POLYMERIZATION OF FORMALDEHYDE
Henri Sidi, Paramus, and Roy T. Gottesman, Glen Rock, N.J., assignors to Heyden Newport Chemical Corporation, New York, N.Y., a corporation of Delaware
No Drawing. Filed Feb. 9, 1961, Ser. No. 88,008
9 Claims. (Cl. 260—67)

This invention relates to a process for the preparation of tough, high molecular weight polymers of formaldehyde. More particularly it relates to the use of certain diamines as polymerization initiators in the preparation of these polymers of formaldehyde.

It is known that formaldehyde can be polymerized in the presence of such polymerization initiators as metal salts, phosphines, arsines, stilbenes, and certain monoamines to form tough, high molecular weight polyoxymethylene which can be used in the preparation of films, fibers, filaments, and molding compounds. It has now been found that another class of compounds can be used in the preparation of these formaldehyde polymers.

In accordance with the present invention, anhydrous monomeric formaldehyde is contacted with the novel polymerization initiator and allowed to polymerize to high molecular weight polyoxymethylene.

The novel polymerization initiators that are employed in this process are N,N,N',N'-tetraalkyl alkylene diamines. The alkyl groups, which may be identical or different groups, are straight-chain or branched-chain groups which contain from 1 to 4 carbon atoms and preferably 1 or 2 carbon atoms. The alkylene groups are straight-chain or branched-chain divalent saturated aliphatic hydrocarbon groups containing from 1 to 6 carbon atoms. Among the specific compounds that may be used in the practice of this invention are N,N,N',N'-tetramethyl methylene diamine, N,N,N',N'-tetramethyl ethylene diamine, N,N,N',N'-tetraethyl ethylene diamine, N,N,N',N'-tetramethyl 1,3-propane diamine, N,N,N',N'-tetrapropyl 1,3-propane diamine, N,N,N',N'-tetramethyl 1,3-butane diamine, N,N,N',N'-tetraethyl 1,4-butane diamine, N,N,N',N'-tetramethyl 1,6-hexane diamine, and N,N,N',N'-tetraethyl 1,6-hexane diamine. A single tetraalkyl alkylene diamine or a mixture of two or more of these diamines may be used.

The amount of the initator that is used is generally between about 0.00001 part and 0.05 part and preferably between about 0.0001 part and about 0.005 part by weight per part by weight of formaldehyde.

The polymerization reaction may be effected in the presence or in the absence of a liquid reaction medium or in a vapor phase reaction. The polymerization is preferably carried out in a substantially anhydrous organic medium which remains liquid under the conditions chosen for the reaction, which is inert to formaldehyde and to the polymerization intiator, and which is a non-solvent for polyoxymethylene. Suitable reaction media include hydrocarbons, chlorinated hydrocarbons, ethers, and the like. The preferred media are the hydrocarbons which contain from 3 to 10 carbon atoms, such as propane, hexane, octane, decane, cyclohexane, benzene, xylene, and decahydronaphthalene.

The amount of the reaction medium used is not critical but may be within the range of about 1 to 1000 parts by weight per part by weight of formaldehyde. In most cases about 1 to 150 parts by weight of the medium is used for each part of formaldehyde.

The polymerization may be carried out in any convenient manner. For example, anhydrous monomeric formaldehyde may be introduced into a reactor containing a reaction medium and the polymerization initiator. Alternatively, the polymerization may be carried out by introducing formaldehyde continuously into a reactor containing the reaction medium and at the same time adding the polymerization initiator at such a rate that the temperature is maintained within the range chosen for the polymerization.

The conditions under which the formaldehyde is polymerized are not critical. The polymerization is generally carried out at a temperature between about −100° C. and 80° C. and preferably between 0° C. and 40° C. While superatmospheric and subatmospheric pressures may be employed, the reaction is in most cases carried out under atmospheric pressure.

The formaldehyde monomer that is used as the starting material in this process may be derived from any convenient source. For example, it may be obtained by pyrolysis of paraformaldehyde, α-polyoxymethylene, or a hemiformal such as cyclohexanol hemiformal. In order to obtain the desired tough, high molecular weight product, it is necessary that the formaldehyde monomer be substantially anhydrous, that is, that it contain less than 0.5% and preferably less than 0.1% by weight of water.

The formation of tough, high molecular weight polyoxymethylene is best effected under non-oxidizing conditions. A convenient way of obtaining such conditions involves sweeping the reactor with a dry inert gas, such as nitrogen, and then carrying out the reaction under a blanket of the inert gas. In addition an antioxidant may be present during the reaction or may be added to the product to reduce oxidative effects. Among the anti-oxidants that may be used for this purpose are phenothiazine, 2-mercaptobenzimidazole, diphenylamine, phenyl-α-naphthylamine, bis(β-naphthylamino)-p-phenylenediamine, and 5-ethyl-10, 10-diphenyl-phenozasiline. The amount of antioxidant used is generally about 0.01% to about 1% based on the weight of the formaldehyde.

The following examples will illustrate the manner in which this invention may be practiced. It is to be understood, however, that these examples are not to be construed as being limitative but are furnished merely for purposes of illustration.

*Example 1*

Anhydrous monomeric formaldehyde was prepared by heating a suspension of 100 grams of α-polyoxymethylene in 400 ml. of paraffin oil at 121°–150° C. The formaldehyde vapors from this pyrolysis were passed through a series of traps, the first of which was maintained at room temperature, the second at 0° C., and the third and fourth at −15 to −20° C. The resulting anhydrous monomeric formaldehyde was introduced along with a stream of dry nitrogen in to a polymerization reactor which contained 1500 ml. of cyclohexane, 0.1 gram of N,N,N',N'-tetramethyl ethylene diamine, and 0.1 gram of phenothiazine. The reaction mixture was stirred vigorously during the addition of the formaldehyde. The polymerization was carried out at 25°–30° C. in a nitrogen atmosphere for approximately 2 hours. When the polymerization was complete, the reaction mixture was filtered. The product was washed with 300 ml. of cyclohexane and dried under vacuum at 65° C. to constant weight. The dried product weighed 61.5 grams. This product may be compression molded, for example, at 180° C. for 2 minutes, to produce tough molded objects.

*Example 2*

Anhydrous monomeric formaldehyde was prepared from 100 grams of α-polyoxymethylene by the procedure described in Example 1. This formaldehyde was then introduced along with a stream of dry nitrogen into a polymerization reactor which contained 1500 ml. of cyclohexane, 0.1 gram of N,N,N',N'-tetramethyl 1,3-butanediamine, and 0.1 gram of phenothiazine. The reaction mixture was stirred vigorously during the addition of the formaldehyde. The polymerization was carried out at 25°–30° C. in a nitrogen atmosphere for approximately 2 hours. When the polymerization was complete, the reaction mixture was filtered. The product was washed with 300 ml. of cyclohexane and dried under vacuum at 65° C. to constant weight. The dried product, which weighed 51.0 grams, was a high molecular weight polyoxymethylene which could be molded to form tough translucent films.

Each of the other N,N,N',N'-tetraalkyl alkylene diamines that have been disclosed herein may be employed in a similar manner to initiate the polymerization of formaldehyde to form tough, high molecular weight polyoxymethylene.

Formaldehyde polymer prepared in accordance with this invention may be converted by melt extrusion, injection molding, compression molding and other fabrication methods to films, fibers, molded articles, and the like.

We claim:

1. A process for the production of high molecular weight polyoxymethylene which comprises contacting substantially anhydrous monomeric formaldehyde at a temperature in the range of approximately −100° C. to 80° C. with a polymerization initiator which is an N,N,N',N'-tetraalkyl alkylene diamine, said polymerization initiator being present in the amount of 0.00001 part to 0.05 part by weight per part by weight of said formaldehyde.

2. The process of claim 1 wherein the polymerization initiator is an N,N,N',N'-tetraalkyl alkylene diamine in which each of the alkyl groups contains from 1 to 4 carbon atoms and the alkylene group is a divalent saturated aliphatic hydrocarbon group that contains from 1 to 6 carbon atoms.

3. The process of claim 1 wherein the polymerization initiator is N,N,N',N'-tetramethyl ethylene diamine.

4. The process of claim 1 wherein the polymerization initiator is N,N,N',N'-tetramethyl 1,3-butane diamine.

5. The process for the production of high molecular weight polyoxymethylene which comprises introducing substantially anhydrous monomeric formaldehyde into a liquid hydrocarbon having 3 to 10 carbon atoms per molecule in the presence of an N,N,N',N'-tetraalkyl alkylene diamine, each of the alkyl groups of said diamine containing from 1 to 4 carbon atoms and the alkylene group being a divalent saturated aliphatic hydrocarbon group containing from 1 to 6 carbon atoms said N,N, N',N'-tetraalkyl alkylene diamine being present in the amount of about 0.00001 part to 0.05 part by weight per part by weight of said formaldehyde, at a temperature of −100° C. to 80° C., and recovering high molecular weight polyoxymethylene.

6. The process for the production of high molecular weight polyoxymethylene which comprises introducing substantially anhydrous monomeric formaldehyde into a reaction medium maintained at 0° C. to 40° C., said reaction medium comprising a liquid hydrocarbon having 3 to 10 carbon atoms per molecule, an antioxidant, and a polymerization initiator, said polymerization initiator being an N,N,N',N'-tetraalkyl alkylene diamine in which each of the alkyl groups contains from 1 to 4 carbon atoms and the alkylene group is a divalent saturated aliphatic hydrocarbon group that contains from 1 to 6 carbon atoms said polymerization initiator being present in the amount of about 0.00001 part to 0.05 part by weight per part by weight of said formaldehyde, agitating said reaction medium and forming a dispersion of high molecular weight polyoxymethylene in said medium, and thereafter recovering the polyoxymethylene.

7. The process of claim 6 wherein the polymerization initiator is N,N,N',N'-tetramethyl ethylene diamine.

8. The process of claim 6 wherein the polymerization initiator is N,N,N',N'-tetramethyl 1,3-butane diamine.

9. The process of claim 6 wherein the polymerization initiator is present in the amount of about 0.0001 part to 0.005 part by weight per part by weight of formaldehyde and the reaction medium is present in the amount of 1 part to 150 parts by weight per part by weight of formaldehyde.

References Cited in the file of this patent

UNITED STATES PATENTS 2,841,570    MacDonald _____ July 1, 1958

UNITED STATES PATENT OFFICE
CERTIFICATE OF CORRECTION

Patent No. 3,097,190                                              July 9, 1963

Henri Sidi et al.

It is hereby certified that error appears in the above numbered patent requiring correction and that the said Letters Patent should read as corrected below.

Column 2, line 34, for "-phenozasiline" read -- -phenazasiline --.

Signed and sealed this 31st day of December 1963.

(SEAL)
Attest:
ERNEST W. SWIDER

Attesting Officer

EDWIN L. REYNOLDS

Acting Commissioner of Patents